(12) United States Patent
Akkarakaran et al.

(10) Patent No.: US 11,812,426 B2
(45) Date of Patent: Nov. 7, 2023

(54) TECHNIQUES FOR SIDELINK CARRIER AGGREGATION (CA) AND MULTI-COMPONENT CARRIER (CC) GRANTS

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Jelena Damnjanovic, Del Mar, CA (US); Peter Gaal, San Diego, CA (US); Junyi Li, Fairless Hills, PA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 17/388,884

(22) Filed: Jul. 29, 2021

(65) Prior Publication Data

US 2022/0053518 A1 Feb. 17, 2022

Related U.S. Application Data

(60) Provisional application No. 63/065,926, filed on Aug. 14, 2020.

(51) Int. Cl.
*H04W 72/1263* (2023.01)
*H04W 72/23* (2023.01)
*H04W 88/04* (2009.01)

(52) U.S. Cl.
CPC ....... *H04W 72/1263* (2013.01); *H04W 72/23* (2023.01); *H04W 88/04* (2013.01)

(58) Field of Classification Search
CPC ............... H04W 72/1263; H04W 72/23
See application file for complete search history.

(56) References Cited

U.S. PATENT DOCUMENTS 11,445,529 B2 * 9/2022 Uziel .................... H04L 1/1819
11,470,584 B2 * 10/2022 Uchiyama ............ H04W 72/20
(Continued)

FOREIGN PATENT DOCUMENTS

EP 3691360 A1 8/2020

OTHER PUBLICATIONS

Intel Corporation: "Sidelink Carrier Aggregation for LTE V2V Communication", 3GPP TSG RAN WG1 Meeting #89, R1-1707300, Intel—V2X_SLCA, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017, XP051272513, 8 pages, Retrieved from the Internet: URL:http://www.3gpp.org/ftp/Meetings_3GPP_SYNC/RAN1/Docs/ [retrieved on May 14, 2017], the whole document.

(Continued)

*Primary Examiner* — Anh Vu H Ly
(74) *Attorney, Agent, or Firm* — Arent Fox, LLP

(57) ABSTRACT

This disclosure relates to multi-component carrier grants. Specifically, in one aspect, a relay UE may identify and transmit to a remote UE, a plurality of sidelink component carriers based on a grant including a plurality of downlink component carriers, the plurality of sidelink component carriers associated with the a second communication channel. In another aspect, a remote UE may receive, from a relay UE, a plurality of sidelink component carriers associated with a first communication channel, the plurality of sidelink component carriers derived from a grant including a plurality of downlink component carriers associated with a second communication channel. In a further aspect, a network entity may determine a grant including a plurality of downlink component carriers associated with a first communication channel, the plurality of downlink compo- (Continued)

nent carriers used to derive a plurality of sidelink component carriers for a remote UE and associated with the a second communication channel.

28 Claims, 11 Drawing Sheets

(56) References Cited

U.S. PATENT DOCUMENTS

| | | | |
|---|---|---|---|
| 2013/0188552 A1 | 7/2013 | Kazmi et al. | |
| 2018/0263026 A1* | 9/2018 | Loehr | H04W 72/0446 |
| 2019/0239264 A1* | 8/2019 | Hahn | H04W 72/20 |
| 2020/0296795 A1* | 9/2020 | Uchiyama | H04W 88/04 |
| 2021/0037503 A1* | 2/2021 | Nam | H04W 72/0446 |
| 2021/0168790 A1* | 6/2021 | Li | H04L 5/0094 |
| 2022/0053481 A1* | 2/2022 | Akkarakaran | H04W 76/14 |
| 2022/0053511 A1* | 2/2022 | Akkarakaran | H04W 72/23 |
| 2022/0053548 A1* | 2/2022 | Akkarakaran | H04W 72/0453 |
| 2022/0232523 A1* | 7/2022 | Lee | H04L 47/125 |

OTHER PUBLICATIONS

International Search Report and Written Opinion—PCT/US2021/043999—ISA/EPO—dated Nov. 10, 2021.
LG Electronics: "PDCCH Structure for Multiple Carrier Aggregation in LTE-Advanced", 3GPP Draft, 3GPP TSG RAN WG1 #57, R1-091697 LTEA_PDCCH Structure, 3rd Generation Partnership Project (3GPP), Mobile Competence Centre, 650, Route Des Lucioles, F-06921, Sophia-Antipolis Cedex, France, No. San Francisco, USA, May 4-8, 2009, Apr. 28, 2009, Apr. 28, 2009 (Apr. 28, 2009), XP050339235, 9 pages, [retrieved on Apr. 28, 2009], section 2.

* cited by examiner

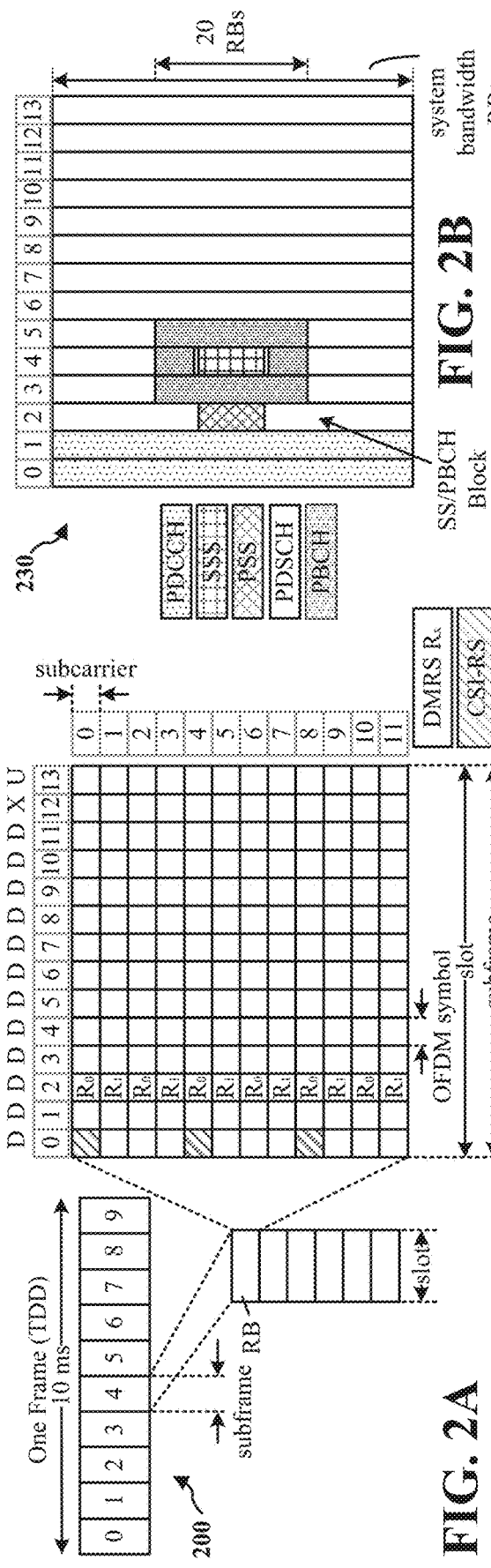
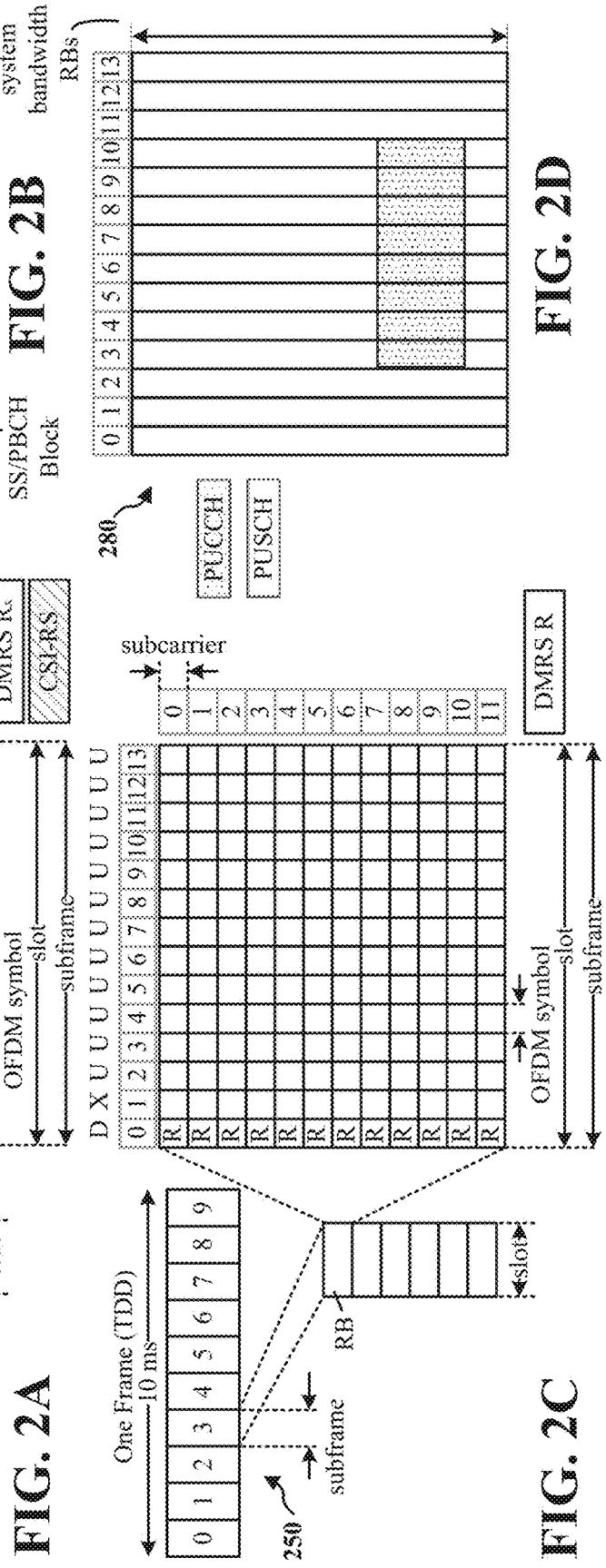
FIG. 2A / FIG. 2B / FIG. 2C / FIG. 2D

TECHNIQUES FOR SIDELINK CARRIER AGGREGATION (CA) AND MULTI-COMPONENT CARRIER (CC) GRANTS

CROSS-REFERENCE TO RELATED APPLICATION(S)

This application claims the benefit of U.S. Provisional Patent Application No. 63/065,926, entitled "TECHNIQUES FOR SIDELINK CARRIER AGGREGATION (CA) AND MULTI-COMPONENT CARRIER (CC) GRANTS" and filed on Aug. 14, 2020, which is expressly incorporated by reference herein in its entirety.

BACKGROUND

The present disclosure relates generally to communication systems, and more particularly, to sidelink carrier aggregation (CA) and multi-component carrier (CC) grants.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. Some wireless communication networks include device-to-device (D2D) communication such as, but not limited to, vehicle-based communication devices that can communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication by a relay user equipment (UE), including receiving, from a network entity, a first multiple component carrier grant including a first plurality of component carriers associated with a first communication channel. The method further includes identifying a second multiple component carrier grant based on the first multiple component carrier grant, the second multiple component carrier grant is associated with the a second communication channel and includes a second plurality of component carriers. The method further includes receiving data on the first plurality of component carriers in resources corresponding to the first multiple component carrier grant. The method further includes transmitting, to a remote UE, the received data in the second plurality of component carriers in resources corresponding to the second multiple component carrier grant.

A further example of the subject matter described in this disclosure can be implemented at an apparatus for wireless communications including a memory and at least one processor coupled to the memory. The at least one processor may be configured to receive, from a network entity, a first multiple component carrier grant including a first plurality of component carriers associated with a first communication channel. The at least one processor is further configured to identify a second multiple component carrier grant based on the first multiple component carrier grant, the second multiple component carrier grant is associated with the a second communication channel and includes a second plurality of component carriers. The at least one processor is further configured to receive data on the first plurality of component carriers in resources corresponding to the first multiple component carrier grant. The at least one processor is further configured to transmit, to a remote UE, the received data in the second plurality of component carriers in resources corresponding to the second multiple component carrier grant.

An additional example of the subject matter described in this disclosure can be implemented at an apparatus for wireless communications including means for receiving, from a network entity, a first multiple component carrier grant including a first plurality of component carriers associated with a first communication channel. The apparatus may further include means for identifying a second multiple component carrier grant based on the first multiple component carrier grant, the second multiple component carrier grant is associated with the a second communication channel and includes a second plurality of component carriers. The apparatus further includes means for receiving data on the first plurality of component carriers in resources corresponding to the first multiple component carrier grant. The apparatus may further include means for transmitting, to a remote UE, the received data in the second plurality of component carriers in resources corresponding to the second multiple component carrier grant.

A further example of the subject matter described in this disclosure can be implemented at a computer-readable medium storing computer executable code, the code when executed by a processor cause the processor to receive, from a network entity, a first multiple component carrier grant including a first plurality of component carriers associated with a first communication channel. The computer-readable medium further including code when executed by a processor cause the processor to identify a second multiple component carrier grant based on the first multiple component carrier grant, the second multiple component carrier grant is associated with the a second communication channel and includes a second plurality of component carriers. The computer-readable medium further including code when executed by a processor cause the processor to receive data on the first plurality of component carriers in resources corresponding to the first multiple component carrier grant. The computer-readable medium further including code when executed by a processor cause the processor to transmit, to a remote UE, the received data in the second plurality of component carriers in resources corresponding to the second multiple component carrier grant.

In a further example, the present disclosure provides a method of wireless communication by a remote UE, including receiving, from a relay UE on a communication channel, data in a plurality of component carriers in resources corresponding to a multiple component carrier grant, the multiple component carrier grant derived from a different multiple component carrier grant including a different plurality of component carriers. The method further includes transmitting, to the relay UE on a communication channel, different data on a sidelink communication channel.

A further example of the subject matter described in this disclosure can be implemented at an apparatus for wireless communications including a memory and at least one processor coupled to the memory. The at least one processor may be configured to receive, from a relay UE on a communication channel, data in a plurality of component carriers in resources corresponding to a multiple component carrier grant, the multiple component carrier grant derived from a different multiple component carrier grant including a different plurality of component carriers. The at least one processor is further configured to transmit, to the relay UE on a communication channel, different data on a sidelink communication channel.

An additional example of the subject matter described in this disclosure can be implemented at an apparatus for wireless communications including means for receiving, from a relay UE on a communication channel, data in a plurality of component carriers in resources corresponding to a multiple component carrier grant, the multiple component carrier grant derived from a different multiple component carrier grant including a different plurality of component carriers. The apparatus further includes means for transmitting, to the relay UE on a communication channel, different data on a sidelink communication channel.

A further example of the subject matter described in this disclosure can be implemented at a computer-readable medium storing computer executable code, the code when executed by a processor cause the processor to receive, from a relay UE on a communication channel, data in a plurality of component carriers in resources corresponding to a multiple component carrier grant, the multiple component carrier grant derived from a different multiple component carrier grant including a different plurality of component carriers. The computer-readable medium further including code when executed by a processor cause the processor to transmit, to the relay UE on a communication channel, different data on a sidelink communication channel.

Additionally, the present disclosure provides a method of wireless communication at a network entity, including determining a first multiple component carrier grant including a first plurality of component carriers associated with a first communication channel, the first multiple component carrier grant used to determine a second multiple component carrier grant associated with the a second communication channel and includes a second plurality of component carriers. The method may further include transmitting, to a relay UE on the first communication channel, the first multiple component carrier grant.

A further example of the subject matter described in this disclosure can be implemented at an apparatus for wireless communications including a memory and at least one processor coupled to the memory. The at least one processor may be configured to determine a first multiple component carrier grant including a first plurality of component carriers associated with a first communication channel, the first multiple component carrier grant used to determine a second multiple component carrier grant associated with the a second communication channel and includes a second plurality of component carriers. The at least one processor may further be configured to transmit, to a relay UE on the first communication channel, the first multiple component carrier grant.

An additional example of the subject matter described in this disclosure can be implemented at an apparatus for wireless communications including means for determining a first multiple component carrier grant including a first plurality of component carriers associated with a first communication channel, the first multiple component carrier grant used to determine a second multiple component carrier grant associated with the a second communication channel and includes a second plurality of component carriers. The apparatus may further include means for transmitting, to a relay UE on the first communication channel, the first multiple component carrier grant.

A further example of the subject matter described in this disclosure can be implemented at a computer-readable medium storing computer executable code, the code when executed by a processor cause the processor to determining a first multiple component carrier grant including a first plurality of component carriers associated with a first communication channel, the first multiple component carrier grant used to determine a second multiple component carrier grant associated with the a second communication channel and includes a second plurality of component carriers. The computer-readable medium further including code when executed by a processor cause the processor to transmit, to a relay UE on the first communication channel, the first multiple component carrier grant.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams of examples of a first 5G/NR frame, DL channels within a 5G/NR subframe, a second 5G/NR frame, and UL channels within a 5G/NR subframe, respectively, for use in communications between two of the communicating nodes in the system of FIG. 1.

DETAILED DESCRIPTION

Figure 1:
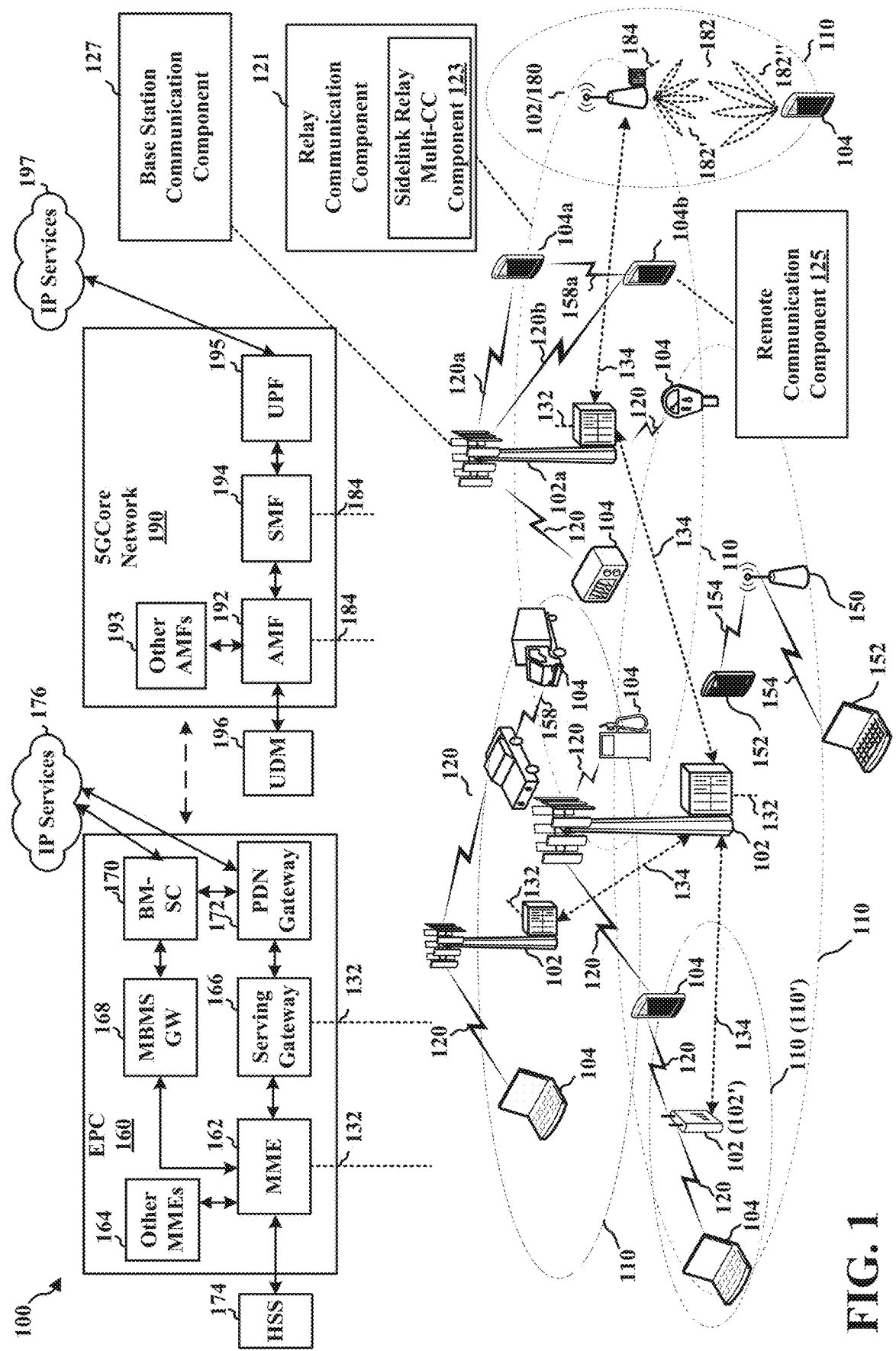
FIG. 1 is a schematic diagram of an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present aspects generally relate to sidelink relay communications, which includes a relay user equipment (UE) relaying communications from a base station over a sidelink to a remote UE, or from the remote UE to the base station via the relay UE. The sidelink may include a physical sidelink shared channel (PSSCH) and a physical sidelink control channel (PSCCH). The PSSCH may carry sidelink data between the relay UE and the remote UE. Sidelink transmission may be defined as a one-to-many scheme, meaning that the data may be received by multiple UEs that belong to a group. The PSCCH may carry the sidelink control information (SCI), which may include information about the resource allocation of the PSSCH.

Specifically, the present disclosure relates to enhancements to the sidelink communications, and in particular, to sidelink carrier aggregation and multi-component carrier (CC) grants. In device-to-device (D2D) communication systems operating according to a New Radio (NR) scheme, which may include a relay UE in communication with both a network entity and a remote UE, carrier aggregation may be implemented on a sidelink between the relay UE and the remote UE. That is, the carriers forming the PSSCH and/or PSCCH may be aggregated to increase the overall transmission bandwidth and, consequently, the achievable data rates on the aforementioned communication channels (e.g., PSSCH and PSCCH). Each aggregated carrier may correspond to a CC. Further, each CC may be of a certain bandwidth and the number of aggregated carriers may not exceed a maximum number of aggregated carriers. Although carrier aggregation may be useful in high data rate applications in D2D communication systems, an implementation of carrier aggregation may result in an increased complexity.

As such, the present disclosure mitigates the implementation complexity and potentially negative impacts on UEs during sidelink carrier aggregation by providing both downlink and sidelink grants to schedule multiple CCs. In particular, a UE such as a relay UE may derive or otherwise identify a set of sidelink component carriers (e.g., which may be used to relay to the remote UE the data received from gNb) on the downlink based on a received grant including a set of downlink component carriers. In other words, rather than combining both downlink and sidelink grants for transmission on downlink control information (DCI), the sidelink grant information may be derived from the downlink grant at the relay UE, thereby mitigating an increase in a size of the DCI (e.g., as a result of carrying both the downlink and sidelink grants).

These and other features of the present disclosure are discussed in detail below with regard to FIGS. 1-11.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, a relay UE 104a may include a relay communication component 121 for assisting with sidelink relay communications between a base station 102a and a remote UE 104b. The relay UE 104a may have a first access link 120a directly with the base station 102a, and a second communication link with the remote UE 104b, which may have a second access link 120b to the base station 102a. The relay communication component 121 of the relay UE 104a may include a sidelink relay multi-CC component 123, which may be selectively configured to derive or otherwise determine a grant of sidelink CCs based on a grant of downlink CCs received from the base station 102a.

Additionally, a remote UE 104b may include a remote communication component 125 for assisting with sidelink relay communication with the relay UE 104a. The remote UE 104b may have sidelink access 158a and in some aspect, an access link 120b to the base station 102a. The remote communication component 125 may be configured to receive data on at least one of a set of sidelink CCs that were received from a relay UE 104a defining a plurality of sidelink component carriers associated with a first communication channel.

Similarly, the base station 102a may include a base station communication component 127 configured to determine a grant including a plurality of downlink component carriers used, by the relay UE 104a, to derive a plurality of sidelink component carriers for a remote UE 104b.

Further details of these multi-CC techniques performed by the relay UE 104a, the remote UE 104b, and the base station 102a are discussed in more detail below.

The base stations 102, including base station 102a, may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5G core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104, including relay UE 104b and sidelink-assisted multi-link UE 104a. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120, including access links 120a and 120b, between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104, such as relay UE 104b and sidelink-assisted multi-link UE 104a, may communicate with each other using device-to-device (D2D) communication link 158, one example of which includes sidelink 158a. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104 described in this disclosure for facilitating multi-CC grants. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ there are 14 symbols/slot and $2^\mu$ slots/subframe. The subcarrier spacing and symbol length/duration are a function of the numerology. The subcarrier spacing may be equal to $2^{\mu*15}$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
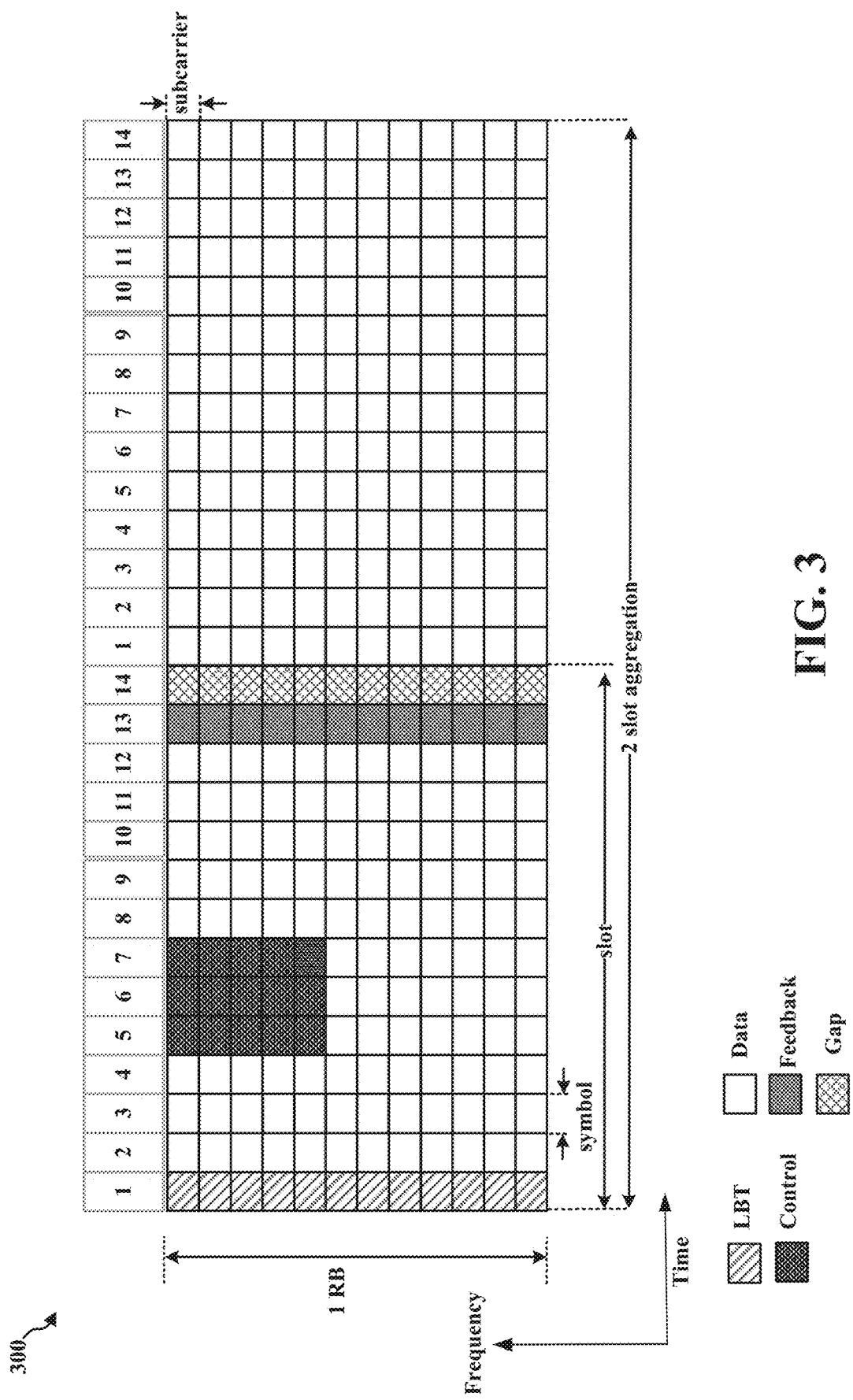
FIG. 3 is a diagram of an example frame structure and resources for sidelink communications between two of the communicating nodes in the system of FIG. 1.

FIG. 3 is a diagram 300 of an example of a slot structure that may be used within a 5G/NR frame structure, e.g., for sidelink communication including multi-CC grants. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. In some implementations, multiple slots may be aggregated together, and the example aggregation of two slots in FIG. 3 should not be considered limiting, as the aggregated number of slots may also be larger than two. When slots are aggregated, the symbols used for feedback and/or a gap symbol may be different that for a single slot.

Figure 4:
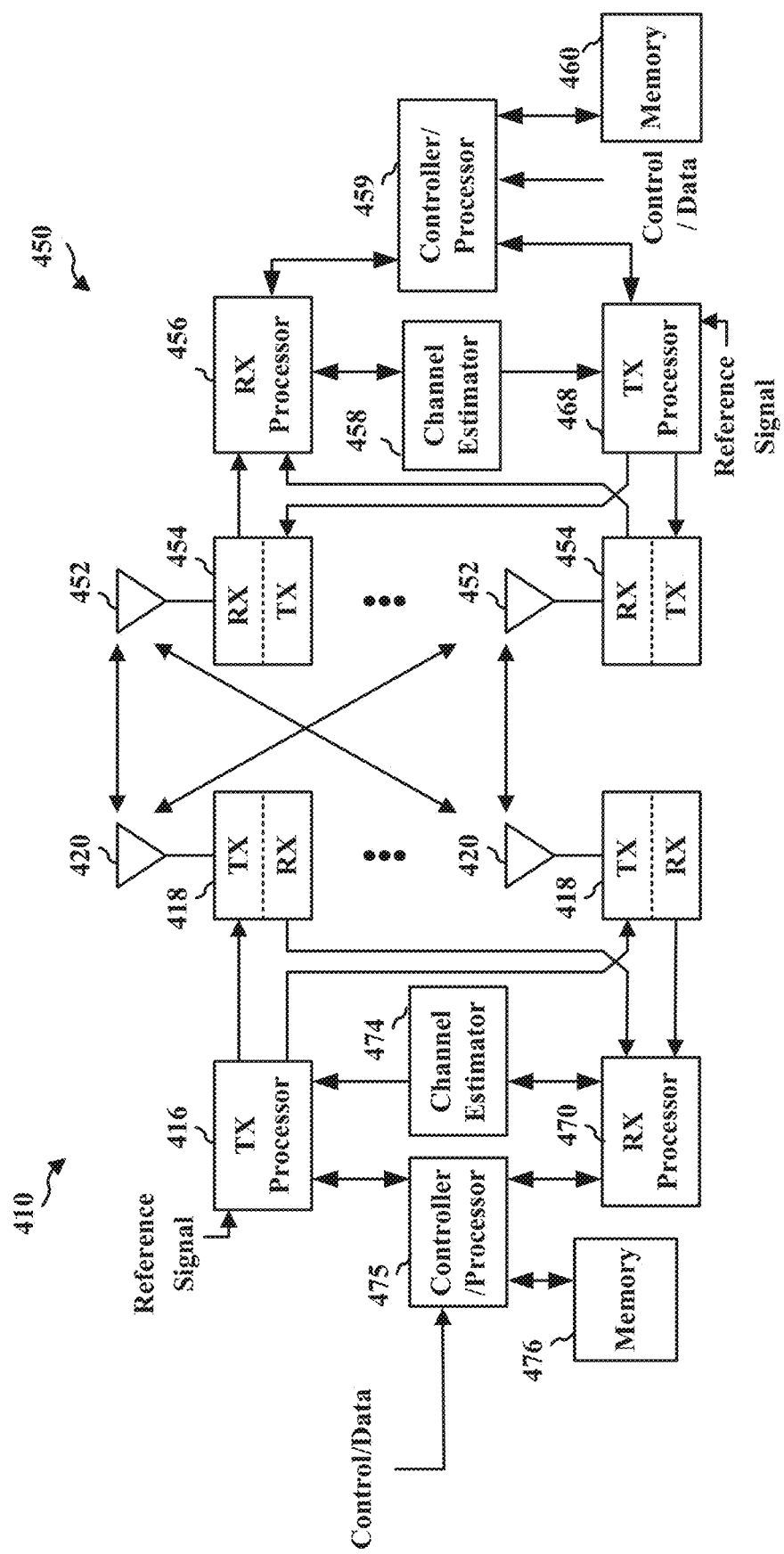
FIG. 4 is a schematic diagram of an example of hardware components of two of the communicating nodes in the system of FIG. 1.

FIG. 4 is a diagram of hardware components of an example transmitting and/or receiving (TX/RX) nodes 410 and 450, which may be any combinations of base station 102-UE 104 communications, and/or UE 104-UE 104 communications in system 100 supporting multi-CC grants. For example, such communications may including, but are not limited to, communications such as a base station 102 transmitting to a relay UE 104a, a relay UE transmitting to a remote UE 104b, a remote UE 104b transmitting to a relay UE 104a, or a relay UE 104a transmitting to a base station 102 in an access network. In one specific example, the TX/RX node 410 may be an example implementation of base station 102 and where TX/RX node 450 may be an example implementation of UE 104. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the tx/rx node 450. Each spatial stream may then be provided to a different antenna 420 via a separate transmitter 418TX. Each transmitter 418TX may modulate an RF carrier with a respective spatial stream for transmission.

At the TX/RX node 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the TX/RX node 450. If multiple spatial streams are destined for the TX/RX node 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the TX/RX node 410. These soft decisions may be based on channel estimates computed by the channel estimator 458. The soft decisions are then decoded and deinterleaved to recover the data and control signals that were originally transmitted by the TX/RX node 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the TX/RX node 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the TX/RX node 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the TX/RX node 410 in a manner similar to that described in connection with the receiver function at the TX/RX node 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the tx/rx node 450. IP packets from the controller/processor 475 may be provided to the EPC 160. The controller/processor 475 is also responsible for error detection using an ACK and/or NACK protocol to support HARQ operations.

In an implementation, at least one of the TX processor 468, the RX processor 456, and the controller/processor 459 may be configured to perform aspects in connection with components 121, 125, and/or 127 of FIG. 1.

In an implementation, at least one of the TX processor 416, the RX processor 470, and the controller/processor 475 may be configured to perform aspects in connection with components 121, 125, and/or 127 of FIG. 1.

Figure 5:
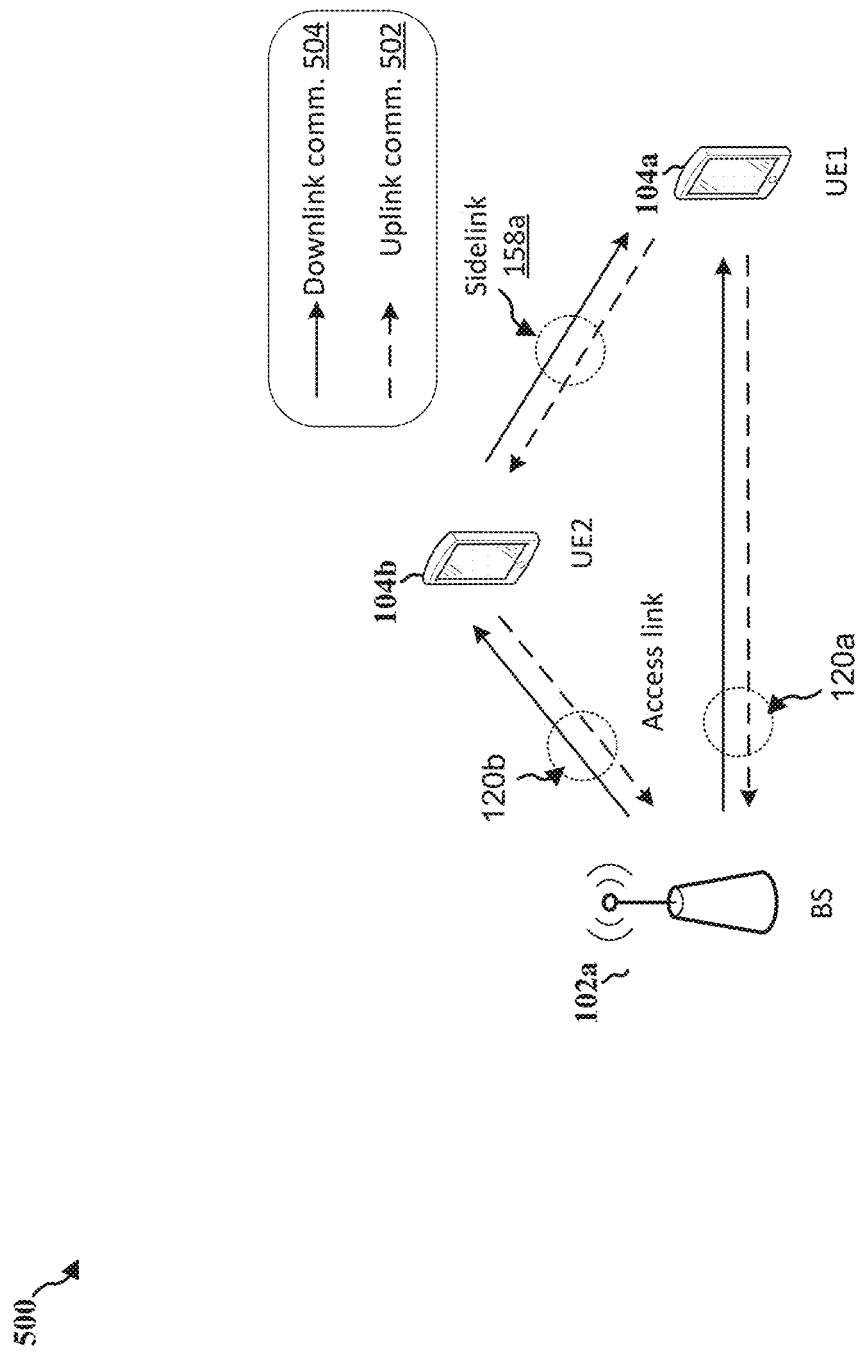
FIG. 5 is a schematic diagram of an example of a sidelink relay communication configuration operable in the system of FIG. 1.
Figure 6:
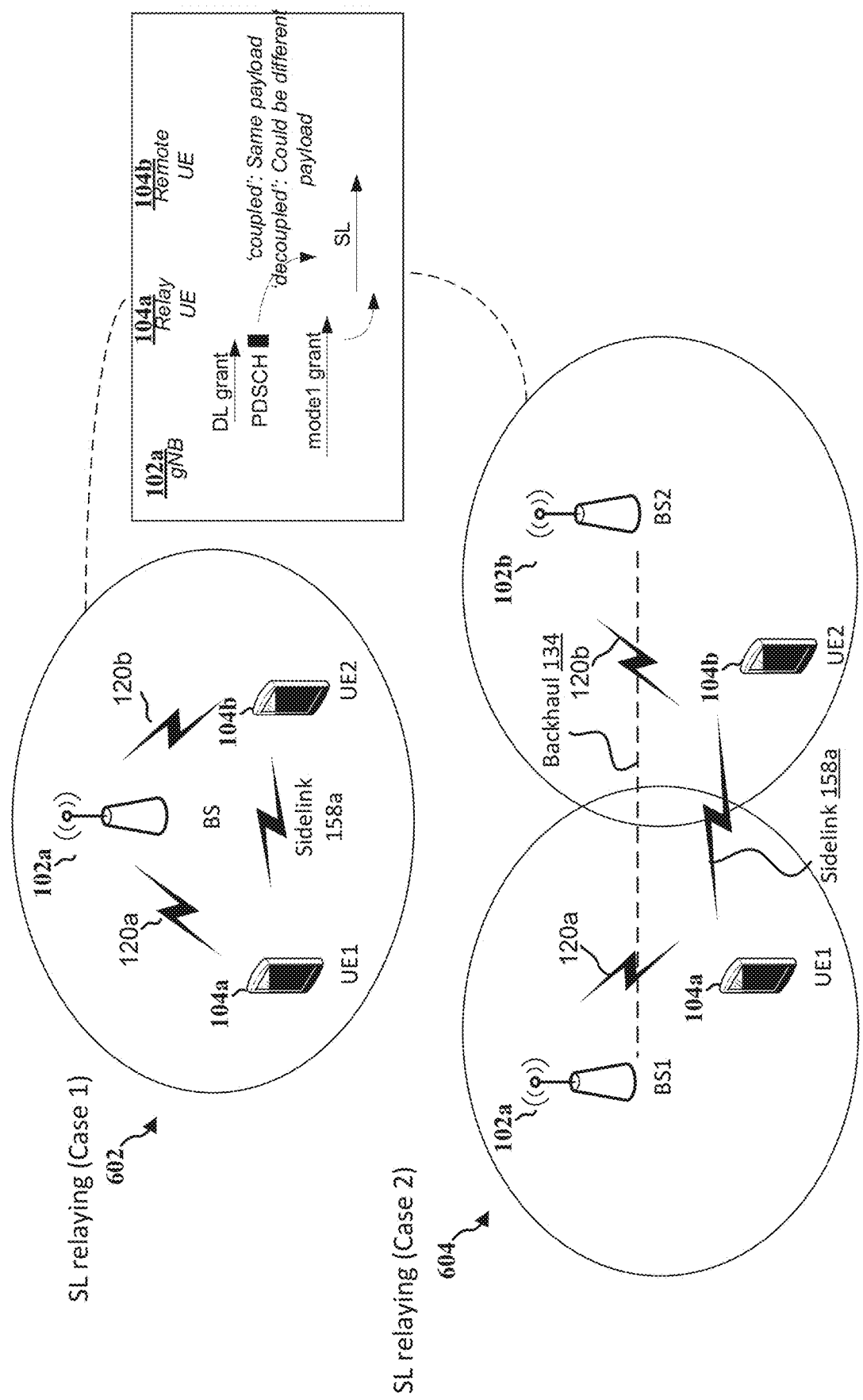
FIG. 6 is a schematic diagram of two different examples of a sidelink relay communication configuration operable in the system of FIG. 1.

Referring to FIGS. 5 and 6, sidelink relay communication scenario 500, 602, and/or 604 include relaying communications over a sidelink. As mentioned above, sidelink communication generally includes any type of D2D communication. D2D communications may be used in applications such as, but not limited to, vehicle-to-anything (V2X) or vehicle to any other device type of communications, sensor networks, public safety-related communication services with limited infrastructure availability, or any other such type of application.

In the sidelink relay communication scenario 500, 602, and/or 604, a relay UE 104a may establish a multi-link communication with one or more base stations 102a and/or 102b over two or more communication links, which include at least one direct link and at least one indirect link via a sidelink with a remote UE 104b. In a first case, such as in the sidelink relay communication scenarios 500 and 602, the sidelink-relay UE 104a directly communicates with the base station 102a via a first access link (AL) 120a, and indirectly communicates with the base station 102a via a sidelink 158a with the remote UE 104b, which has a second access link 120b with the base station 102a.

In general, an access link such as access link 120a or 120b is a communication link between a respective UE and a respective base station (or gNB), which may also be referred to as a Uu interface in 4G LTE and/or in 5G NR technologies. In general, the sidelink 158a is a communication link between UEs, which may be referred to as a PC5 interface in 4G LTE and/or in 5G NR technologies. In any case, the sidelink relay communication scenario 500, 602, and/or 604 may be utilized for improved diversity, e.g., sending the same data over two links (access link and sidelink), and/or improved throughput, e.g., sending different, independent data over each link. In an implementation, in a mmW system, this type of multi-link communication may be attained using multiple transmit/receive beams and multiple antenna panels (sub-arrays) between the UEs and/or between a respective UE and a respective base station/gNB.

Further, in a second case, such as in the sidelink relay communication scenario 604, the relay UE 104a may establish multiple links with multiple base stations 102a and 102b, which may be referred to as a multi-transmit-receive point (multi-TRP) architecture. In this case, the relay UE 104a directly communicates with the base station 102a via a first access link (AL) 120a, and indirectly communicates with the base station 102b via a sidelink 158a with the remote UE 104b, which has a second access link 120b with the base station 102b. Additionally, in this case, the base stations 102a and 102b may exchange communications over a backhaul link 134a.

Additionally, in the sidelink relay communication scenario 500, 602, and/or 604, the communications exchanged between the base station 102a/102b, relay UE 104a, and remote UE 104b may be uplink (UL) communications 502 and/or downlink (DL) communications 504 (see FIG. 5).

In some implementations, a downlink grant including a first set of CCs and a sidelink grant including a second set of CCs (e.g., Mode 1) may be combined into a single control message, or remain separate. The downlink grant including a first set of CCs may schedule downlink data transmissions in one or more CCs from the base station 102 (e.g., gNb) to the relay UE 104a, and the sidelink grant including a second set of CCs may schedule relaying of the data received from the base station 102 to the remote UE 104b. A coupled grant may be formed by combining the downlink and sidelink grants. In some scenarios, the content of the downlink transmission and the content of the sidelink relay transmission may be the same. However, in some scenarios, MAC control elements (MAC-CEs) may be added or removed, or padding may be added or removed if the transport block sizes (TBSs) do not match, but the contents of both downlink and relay transmissions will overlap significantly.

In some aspects, a negative acknowledgment (NACK) for the physical downlink shared channel (PDSCH) may cancel the sidelink grant to avoid relaying corrupted data received on the downlink by the remote UE 104b. Additionally, the sidelink grant allocating resources on the sidelink for the purpose of relaying may have over-allocated resource to accommodate potential sidelink relay retransmission, and an acknowledgment indicating successful delivery on the sidelink may cancel any unused portion of the over-allocated sidelink resources.

With respect to multi-CC grants, both downlink grants and sidelink grants may schedule multiple CCs. As both downlink and sidelink grants schedule multiple CCs, the grants may be combined since data received corresponding to the downlink grants may be relayed on the sidelink to the remote UE 104b, and may be of technical benefit to receive the sidelink grants at the same time as downlink grants are received. However, combining the downlink and sidelink grants may result in a large DCI size. As such, UEs and relay UEs in particular may benefit from techniques for implicitly defining and thereby deriving the sidelink grant from the downlink grant. That is, to mitigate an increase in DCI size, the relay UE may implicitly derive sidelink grants from downlink grants. In some aspects, the mapping may be one-to-one, one-to-many, or many-to-one (e.g., may be preconfigured or indicated in DCI).

In an example, the relay UE 104a may consistently have a set of designated resources. The relay UE 104a may be configured to relay information received on the downlink from the base station 102 to the remote UE 104b using the designated resources. As such, the relay UE 104a may not need an explicit sidelink grant indicating which resource to use for relaying data to the remote UE 104b. Further, if a sidelink component carrier is not explicitly included in the grant received by the relay UE 104*a* from the base station 102, the mapping between downlink component carriers and sidelink component carriers may be used to deduce the sidelink component carriers.

Additionally, if the relay UE fails to receive the downlink data correctly, it may not relay the downlink data to the remote UE and may cancel the corresponding sidelink grant(s). In some aspects, variable size DCI and/or sidelink control information (SCI) may be permitted depending on a number of CCs or grants scheduled. This may result in increased complexity but lower overhead if a maximum number of CCs is not scheduled. For example, a two-stage DCI/SCI may be used with a fixed size first stage including indication of the variable size.

In some aspects, a fully coupled (e.g., combined downlink and sidelink grants having a same payload) scenario with a single CC may be split into multiple cases. In a first example of a per CC or grant coupling, each downlink payload on a specific CC may be relayed on a corresponding sidelink grant. In this example, the mapping may be one-to-one, one-to-many, many-to-one may be implemented. In particular, a one-to-many mapping may correspond to a payload duplication, a many-to-one mapping may correspond to a concatenate payloads. In a further example, a downlink packet in a first CC may be relayed using a first SCI grant, and a second CC may be relayed using grant a second SCI grant. In a further example, downlink data on a first CC of a first set of downlink CCs may be relayed to the remote UE 104*b* on a second CC of the second set of sidelink CCs, and uplink data on second CC of the second set of sidelink CCs may be relayed to the base station 102 on the first CC of the first set of downlink CCs.

That is, in a particular multi-CC transmission scenario in which the downlink transmission may be made in multiple CCs to the relay UE 104*b*, a determination may be made on the manner by which the received data is to be relayed to the remote UE 104*b* without a large DCI. In a first example of determining the method of relaying the downlink data to the remote UE 104*b*, the relay UE 104*a* may use the data received in a downlink CC and relay the data using an implicit sidelink grant associated with the downlink CC in which the data is received from the base station 102. That is, a sidelink grant may implicitly be derived from the downlink CC. Hence, there may be an association between the downlink CCs and a sidelink grants. In particular, there may be a one-to-many mapping/association which corresponds to data duplication, i.e., data received in one downlink CC may be relayed multiple times using multiple implicitly derived sidelink grants. There may also be a many-to-one mapping which may correspond to data concatenation, i.e., data received in plurality of downlink CCs may be combined and relaying using one sidelink grant.

In a further aspect, a set of bits in all the downlink payloads may be relayed on the set of sidelink grants, but the bits may be repartitioned. For example, the relay UE 104*a* may combine the payloads in all CCs, and relays them using a partitioning rule across CCs. In an example of determining the manner by which to relay the downlink data received on multiple downlink CCs to the remote UE 104*b*, the relay UE 104*a* can combine all of the downlink data received on multiple downlink CCs, and relay the data using repartition of the combined data over multiple sidelink grants. For example, the relay UE 104*a* may receive 1K bits in a first downlink CC and 1K bits in a second downlink CC. The relay UE 104*a* may combine both to obtain 2K bits, and relay 0.5K bits using a first sidelink grant and 1.5K bits using s second sidelink grant.

Figure 7:
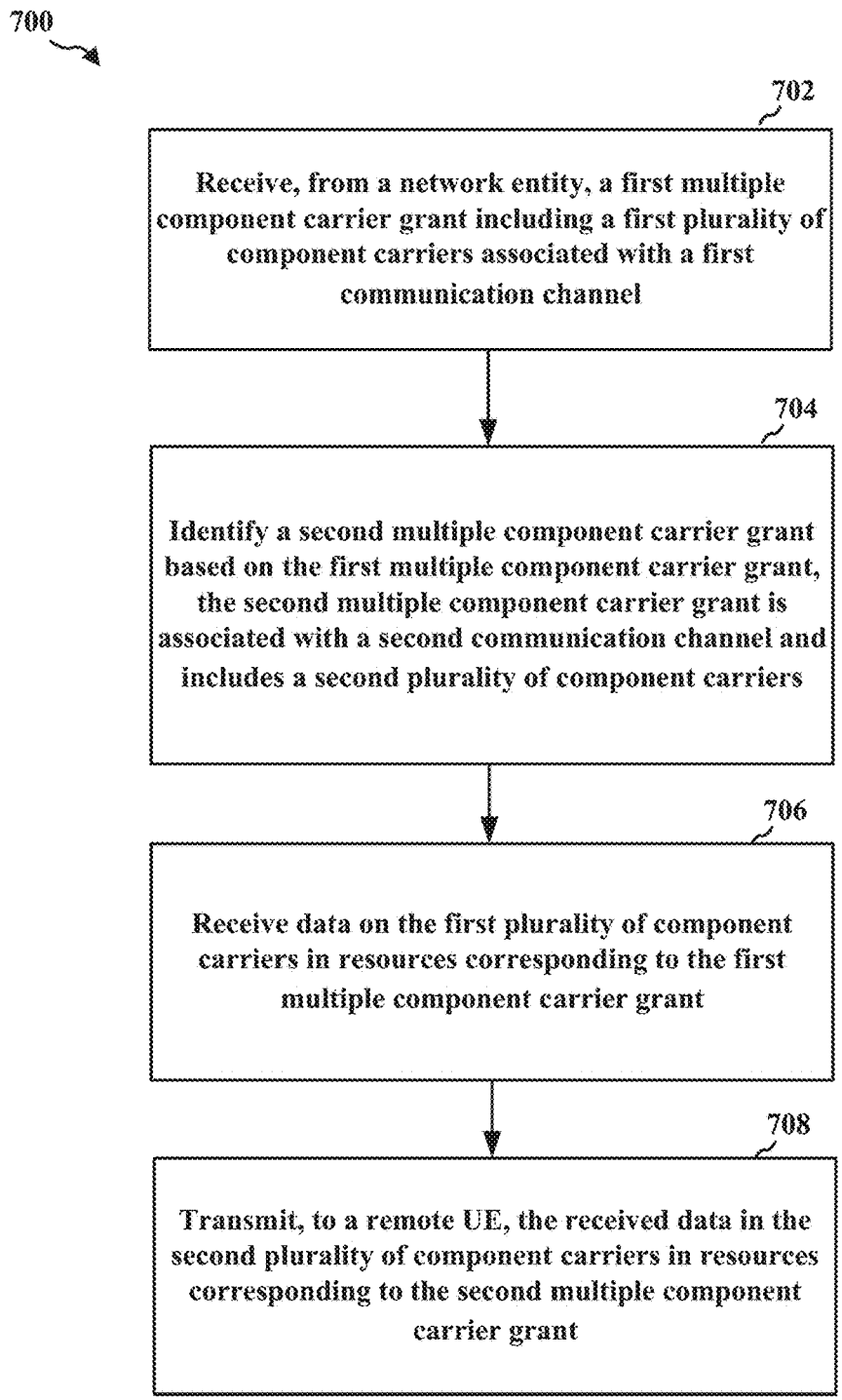
FIG. 7 is a flowchart of an example method of wireless communication at a relay UE operable in the system of FIG. 1.
Figure 10:
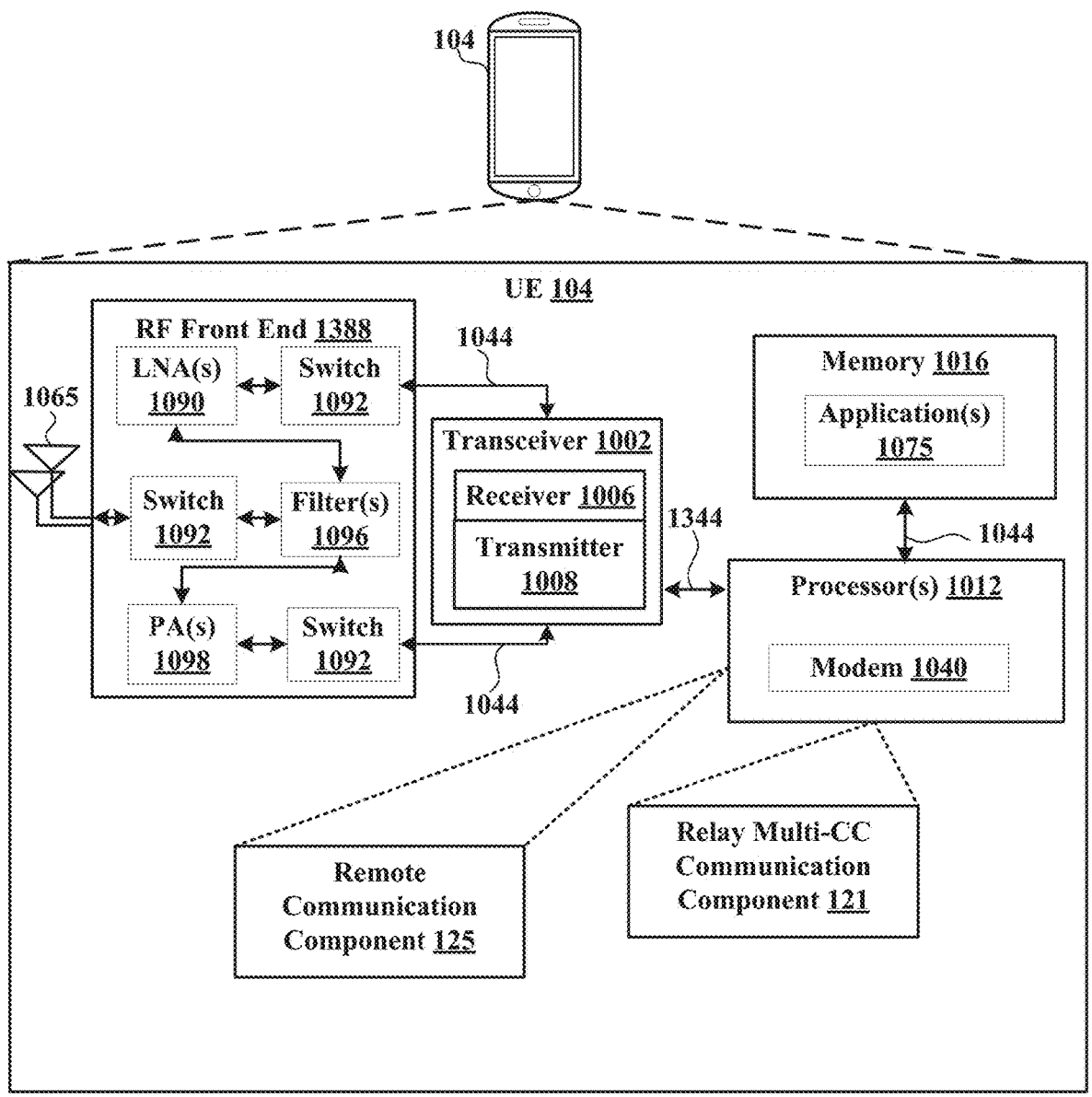
FIG. 10 is a block diagram of an example UE, in accordance with various aspects of the present disclosure.

Referring to FIG. 7, an example method 1000 of wireless communication may be performed by the relay UE 104*a*, which may include one or more components as discussed in FIG. 1, 4, or 10, and which may operate according to the multi-CC grant techniques as discussed above with regard to FIGS. 5 and 6.

At 702, method 700 includes receiving, from a network entity, a first multiple component carrier grant including a first plurality of component carriers associated with a first communication channel. For example, in an aspect, the relay UE 104*a* may operate one or any combination of antennas 1065, RF front end 1088, transceiver 1002, processor 1012, memory 1016, modem 1040, or relay multi-CC communication component 121 to receive, from a network entity, a first multiple component carrier grant including a first plurality of component carriers associated with a first communication channel.

At 704, method 700 includes identifying a second multiple component carrier grant based on the first multiple component carrier grant, the second multiple component carrier grant is associated with the a second communication channel and includes a second plurality of component carriers. For example, in an aspect, the relay UE 104*a* may operate one or any combination of transceiver 1002, processor 1012, memory 1016, modem 1040, or relay multi-CC communication component 121 to identify a second multiple component carrier grant based on the first multiple component carrier grant, the second multiple component carrier grant is associated with the a second communication channel and includes a second plurality of component carriers.

At 706, method 700 includes receiving data on the first plurality of component carriers in resources corresponding to the first multiple component carrier grant. For example, in an aspect, the relay UE 104*a* may operate one or any combination of antennas 1065, RF front end 1088, transceiver 1002, processor 1012, memory 1016, modem 1040, or relay multi-CC communication component 121 to receive data on the first plurality of component carriers in resources corresponding to the first multiple component carrier grant.

At 708, method 700 includes transmitting, to a remote UE, the received data in the second plurality of component carriers in resources corresponding to the second multiple component carrier grant. For example, in an aspect, the relay UE 104*a* may operate one or any combination of antennas 1065, RF front end 1088, transceiver 1002, processor 1012, memory 1016, modem 1040, or relay multi-CC communication component 121 to transmit, to a remote UE, the received data in the second plurality of component carriers in resources corresponding to the second multiple component carrier grant.

In some implementations, the first multiple component carrier grant may correspond to a downlink transmission and the second multiple component carrier grant may correspond to a sidelink transmission.

In some implementations, identifying the second multiple component carrier grant may be further composed of mapping of the second multiple component carrier grant to the first multiple component carrier grant.

In some implementations, the first multiple component carrier grant may correspond to a downlink grant defined in a DCI, and a size of the DCI may be based on a number of component carriers per multiple component carrier grant.

In some implementations, the method 700 may further include identifying a size of SCI based on a number of component carriers per the second multiple component carrier grant, where transmitting in the second plurality of component carriers may include transmitting, via SCI to the remote UE, in one or more of the second plurality of component carriers.

In some implementations, the method 700 may further include receiving data on a PDSCH, transmitting a NACK in response to receiving data on the PDSCH, and terminating the second multiple component carrier grant associated with the PDSCH.

In some implementations, the first multiple component carrier grant may be combined with the second multiple component carrier grant as a single grant associated with a respective downlink payload and sidelink grant.

In some implementations, a downlink transmission on a first component carrier of the first plurality of component carriers may be relayed to the remote UE using a first sidelink grant associated with one of the second plurality of component carriers; and a downlink transmission on a second component carrier of the first plurality of component carriers may be relayed to the remote UE using a second sidelink grant associated with the one of the second plurality of component carriers.

In some implementations, the method 700 may further include identifying a partition of the data received on the first plurality of component carriers, and relaying a first portion of the partition using one of the plurality of the second component carriers and a second portion of the partition using another one of the plurality of the second component carriers.

In some implementations, the first communication channel may correspond to a PDSCH, and the second communication channel may correspond to a PSSCH.

Figure 8:
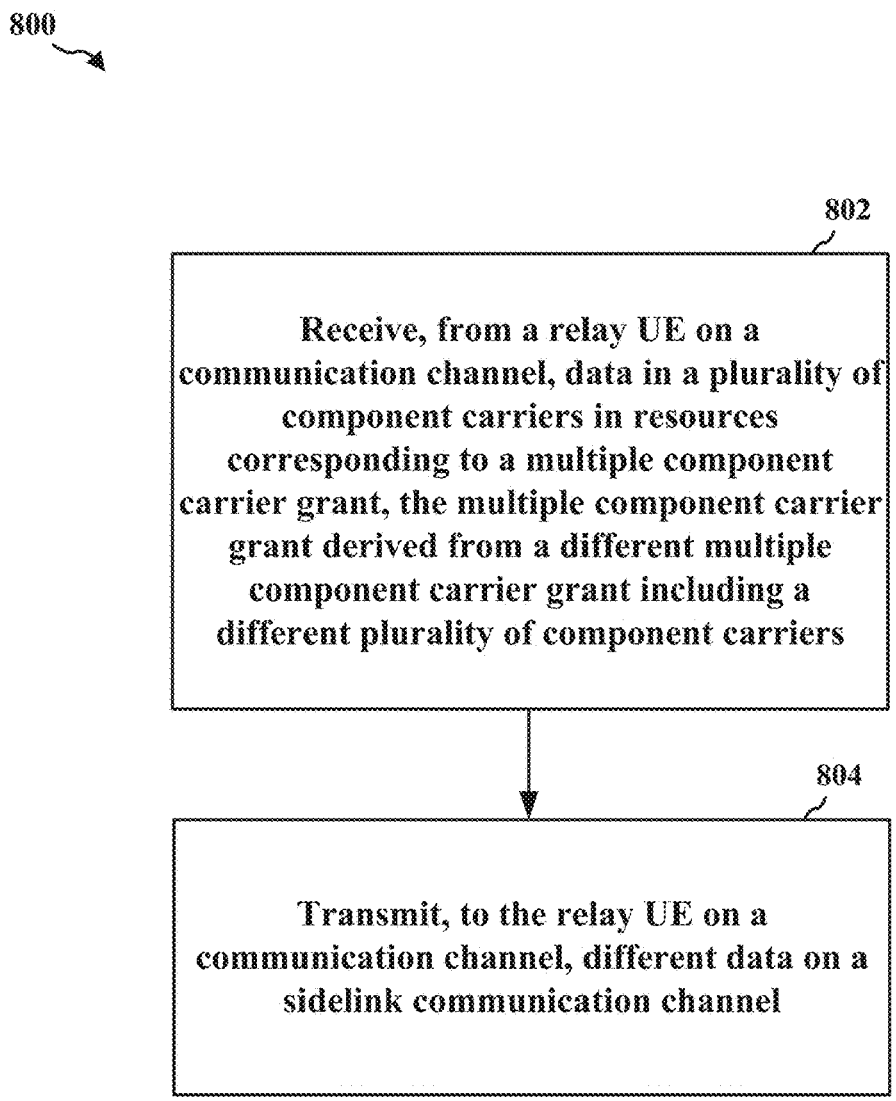
FIG. 8 is a flowchart of another example method of wireless communication at a remote UE operable in the system of FIG. 1.

Referring to FIG. 8, an example method 800 of wireless communication may be performed by the remote UE 104b, which may include one or more components as discussed in FIG. 1, 4, or 10, and which may operate according to the multi-CC grant techniques as discussed above with regard to FIGS. 5 and 6.

At 802, method 800 includes receiving, from a relay UE on a communication channel, data in a plurality of component carriers in resources corresponding to a multiple component carrier grant, the multiple component carrier grant derived from a different multiple component carrier grant including a different plurality of component carriers. For example, in an aspect, the remote UE 104b may operate one or any combination of antennas 1065, RF front end 1088, transceiver 1002, processor 1012, memory 1016, modem 1040, or remote communication component 125 to receive, from a relay UE on a communication channel, data in a plurality of component carriers in resources corresponding to a multiple component carrier grant, the multiple component carrier grant derived from a different multiple component carrier grant including a different plurality of component carriers.

At 804, method 800 includes transmitting, to the relay UE on a communication channel, different data on a sidelink communication channel. For example, in an aspect, the remote UE 104b may operate one or any combination of transceiver 1002, processor 1012, memory 1016, modem 1040, or remote communication component 125 to transmit, to the relay UE on a communication channel, different data on a sidelink communication channel.

In some implementations, the different multiple component carrier may correspond to a downlink transmission and the multiple component carrier may correspond to a sidelink transmission.

In some implementations, the multiple component carrier grant may be based on a mapping of a first multiple component carrier grant to a second multiple component carrier grant.

In some implementations, a size of SCI may be based on a number of component carriers per multiple component carrier grant, the method 800 may further include receiving at least the multiple component carrier grant includes receiving, via SCI to the remote UE, at least the multiple component carrier grant.

In some implementations, the method 800 may further include receiving, from the relay UE, a downlink transmission on a first component carrier of the plurality of component carriers using a first sidelink grant associated with one of the plurality of component carriers, and receiving, from the relay UE, a downlink transmission on a second component carrier of the plurality of component carriers is relayed to the remote UE using a second sidelink grant associated with the one of the plurality of component carriers.

In some implementations, the communication channel may correspond to a PSCCH.

Figure 9:
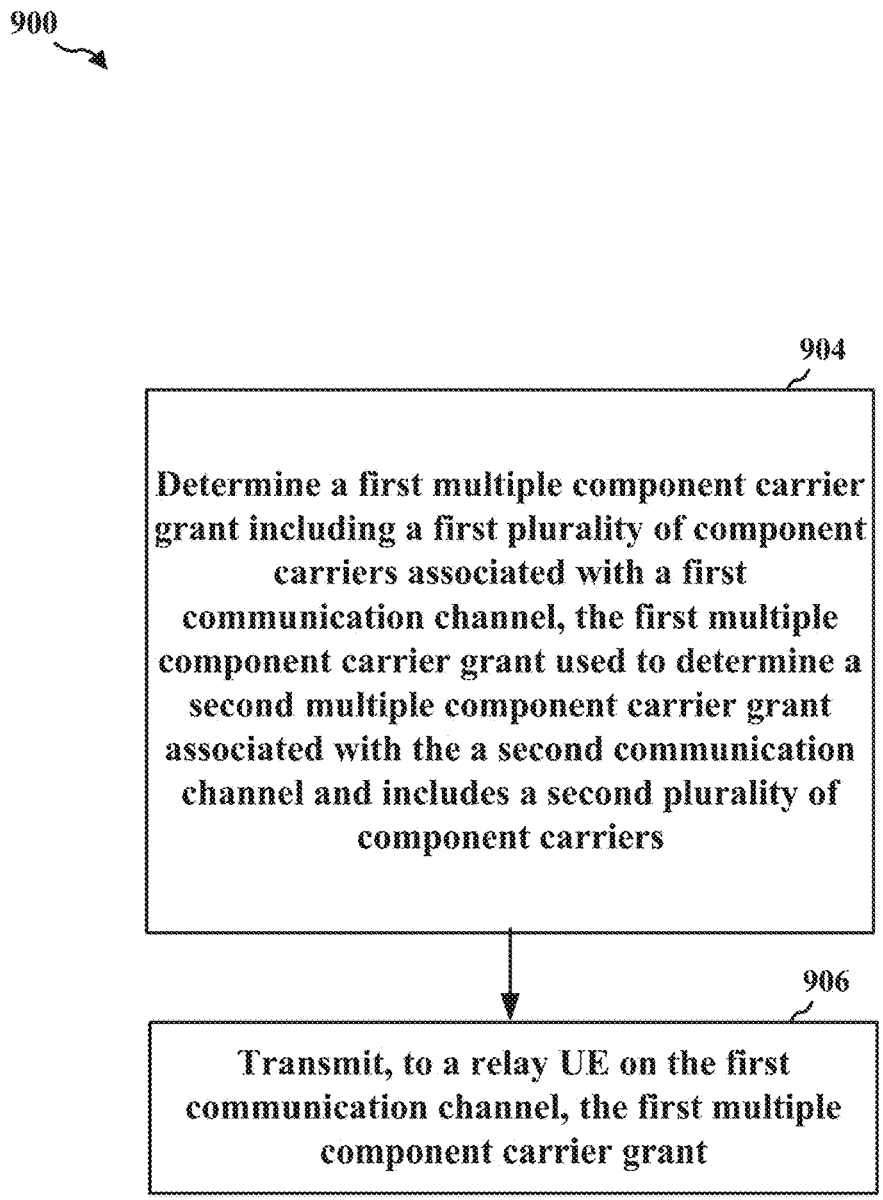
FIG. 9 is a flowchart of a method of wireless communication at a network entity operable in the system of FIG. 1.
Figure 11:
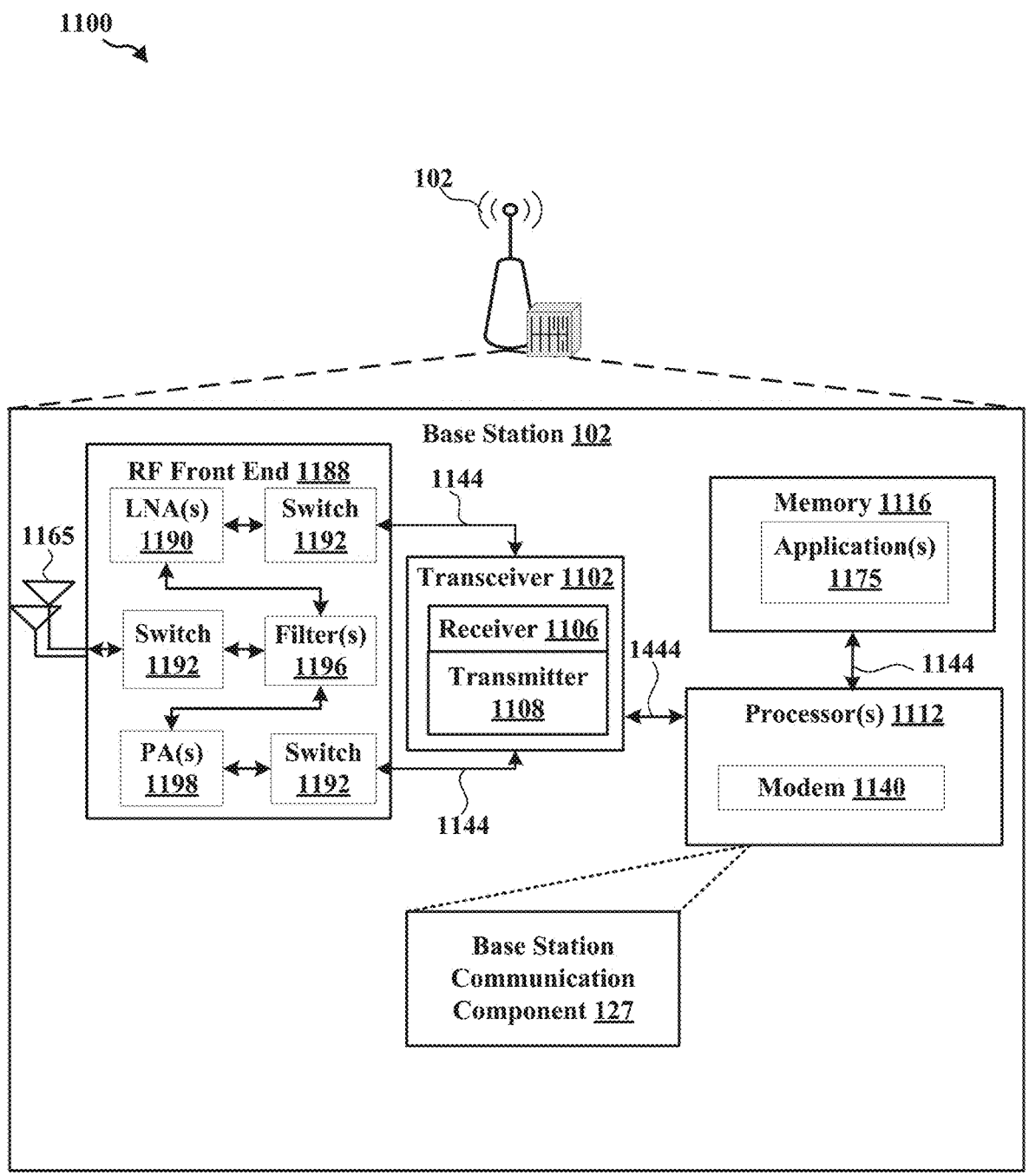
FIG. 11 is a block diagram of an example base station, in accordance with various aspects of the present disclosure.

Referring to FIG. 9, an example method 900 of wireless communication may be performed by a network entity, such as the base station 102, which may include one or more components as discussed in FIG. 1, 4, or 11, and which may operate according to the multi-CC grant techniques as discussed above with regard to FIGS. 5 and 6.

At 902, method 900 includes determining a first multiple component carrier grant including a first plurality of component carriers associated with a first communication channel, the first multiple component carrier grant used to determine a second multiple component carrier grant associated with the a second communication channel and includes a second plurality of component carriers. For example, in an aspect, the network entity 102 may operate one or any combination of a modem or processor, receiver chain component, memory, and/or base station communication component 127 thereof may be executed to determine a first multiple component carrier grant including a first plurality of component carriers associated with a first communication channel, the first multiple component carrier grant used to determine a second multiple component carrier grant associated with the a second communication channel and includes a second plurality of component carriers.

At 904, method 900 includes transmitting, to a relay UE on the first communication channel, the first multiple component carrier grant. For example, in an aspect, the network entity 102 may operate one or any combination of a modem, base station communication component 127, processor, receiver chain component, and/or memory thereof may be executed to transmit, to a relay UE on the first communication channel, the first multiple component carrier grant.

In some implementations, the second multiple component carrier grant may be further composed of mapping of the second multiple component carrier grant to the first multiple component carrier grant.

In some implementations, a size of the DCI may be based on a number of component carriers per multiple component carrier grant.

In some implementations, the first communication channel may correspond to a PDSCH.

In some implementations, the second communication channel may correspond to a PSSCH.

Referring to FIG. 10, one example of an implementation of UE 104, including relay UE 104a and/or remote UE 104b, may include a variety of components, some of which have already been described above and are described further herein, including components such as one or more processors 1012 and memory 1016 and transceiver 1002 in communication via one or more buses 1044, which may operate in conjunction with modem 1040 and/or relay multi-CC communication component 121 and/or remote communication component 125 for receiving multi-CC grants.

In an aspect, the one or more processors 1012 can include a modem 1040 and/or can be part of the modem 1040 that uses one or more modem processors. Thus, the various functions related to relay multi-CC communication component 121 and/or remote communication component 125 may be included in modem 1040 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1040 associated with relay multi-CC communication component 121 and/or remote communication component 125 may be performed by transceiver 1002.

Also, memory 1016 may be configured to store data used herein and/or local versions of applications 1075 or communicating component 1042 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining relay multi-CC communication component 121 and/or remote communication component 125 and/or one or more of its subcomponents, and/or data associated therewith, when UE 104 is operating at least one processor 1012 to execute relay multi-CC communication component 121 and/or remote communication component 125 and/or one or more of its subcomponents.

Transceiver 1002 may include at least one receiver 1006 and at least one transmitter 1008. Receiver 1006 may include hardware and/or software executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 102. Additionally, receiver 1006 may process such received signals, and also may obtain measurements of the signals, such as, but not limited to, Ec/Io, signal-to-noise ratio (SNR), reference signal received power (RSRP), received signal strength indicator (RSSI), etc. Transmitter 1008 may include hardware and/or software executable by a processor for transmitting data, the code comprising instructions and being stored in a memory (e.g., computer-readable medium). A suitable example of transmitter 1008 may including, but is not limited to, an RF transmitter.

Moreover, in an aspect, UE 104 may include RF front end 1088, which may operate in communication with one or more antennas 1065 and transceiver 1002 for receiving and transmitting radio transmissions, for example, wireless communications transmitted by at least one base station 102 or wireless transmissions transmitted by UE 104. The one or more antennas 1065 may include one or more antenna panels and/or sub-arrays, such as may be used for beamforming. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and its specified gain value based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA 1098, based on a configuration as specified by transceiver 1002 and/or processor 1012.

As such, transceiver 1002 may be configured to transmit and receive wireless signals through one or more antennas 1065 via RF front end 1088. In an aspect, transceiver may be tuned to operate at specified frequencies such that UE 104 can communicate with, for example, one or more base stations 102 or one or more cells associated with one or more base stations 102. In an aspect, for example, modem 1040 can configure transceiver 1002 to operate at a specified frequency and power level based on the UE configuration of the UE 104 and the communication protocol used by modem 1040.

In an aspect, modem 1040 can be a multiband-multimode modem, which can process digital data and communicate with transceiver 1002 such that the digital data is sent and received using transceiver 1002. In an aspect, modem 1040 can be multiband and be configured to support multiple frequency bands for a specific communications protocol. In an aspect, modem 1040 can be multimode and be configured to support multiple operating networks and communications protocols. In an aspect, modem 1040 can control one or more components of UE 104 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1012 may correspond to one or more of the processors described in connection with the UE in FIG. 4. Similarly, the memory 1016 may correspond to the memory described in connection with the UE in FIG. 4.

Referring to FIG. 11, one example of an implementation of base station 102 (e.g., a base station 102, 102a, and/or 102b, as described above) may include a variety of components, some of which have already been described above, but including components such as one or more processors 1112 and memory 1116 and transceiver 1102 in communication via one or more buses 1144, which may operate in conjunction with modem 1440 and base station communication component 127 for communicating multi-CC grant information.

The transceiver 1102, receiver 1106, transmitter 1108, one or more processors 1112, memory 1116, applications 1475, buses 1144, RF front end 1188, LNAs 1190, switches 1492, filters 1496, PAs 1498, and one or more antennas 1465 may be the same as or similar to the corresponding components of UE 104, as described above, but configured or otherwise programmed for base station operations as opposed to UE operations.

In an aspect, the processor(s) 1112 may correspond to one or more of the processors described in connection with the base station in FIG. 4. Similarly, the memory 1116 may correspond to the memory described in connection with the base station in FIG. 4.

Some Additional Examples

The aspects described herein additionally include one or more of the following aspect examples described in the following numbered clauses.

1. A method of wireless communication at a relay user equipment (UE), comprising:
   receiving, from a network entity, a first multiple component carrier grant including a first plurality of component carriers associated with a first communication channel;
   identifying a second multiple component carrier grant based on the first multiple component carrier grant, the second multiple component carrier grant is associated with the a second communication channel and includes a second plurality of component carriers;
   receiving data on the first plurality of component carriers in resources corresponding to the first multiple component carrier grant; and
      transmitting, to a remote UE, the received data in the second plurality of component carriers in resources corresponding to the second multiple component carrier grant.
2. The method of clause 1, wherein the first multiple component carrier grant corresponds to a downlink transmission and the second multiple component carrier grant corresponds to a sidelink transmission.
3. The method of any of clause 1 to clause 2, wherein identifying the second multiple component carrier grant is further composed of mapping of the second multiple component carrier grant to the first multiple component carrier grant.
4. The method of any of clause 1 to clause 3, wherein the first multiple component carrier grant corresponds to a downlink grant defined in a downlink control information (DCI), and wherein a size of the DCI is based on a number of component carriers per multiple component carrier grant.
5. The method of any of clause 1 to clause 4, further comprising:
   identifying a size of sidelink control information (SCI) based on a number of component carriers per the second multiple component carrier grant,
   wherein transmitting in the second plurality of component carriers includes transmitting, via SCI to the remote UE, in one or more of the second plurality of component carriers.
6. The method of any of clause 1 to clause 5, further comprising:
   receiving data on a physical downlink shared channel (PDSCH);
   transmitting a negative acknowledgment (NACK) in response to receiving data on the PDSCH; and
   terminating the second multiple component carrier grant associated with the PDSCH.
7. The method of any of clause 1 to clause 6, wherein the first multiple component carrier grant is combined with the second multiple component carrier grant as a single grant associated with a respective downlink payload and sidelink grant.
8. The method of any of clause 1 to clause 7, wherein a downlink transmission on a first component carrier of the first plurality of component carriers is relayed to the remote UE using a first sidelink grant associated with one of the second plurality of component carriers, and a downlink transmission on a second component carrier of the first plurality of component carriers is relayed to the remote UE using a second sidelink grant associated with the one of the second plurality of component carriers.
9. The method of any of clause 1 to clause 8, further comprising:
   identifying a partition of the data received on the first plurality of component carriers; and
   relaying a first portion of the partition using one of the plurality of the second component carriers and a second portion of the partition using another one of the plurality of the second component carriers.
10. The method of any of clause 1 to clause 9, wherein the first communication channel corresponds to a physical downlink shared channel (PDSCH), and the second communication channel corresponds to a physical sidelink shared channel (PSSCH).
11. A method of wireless communication at a remote user equipment (UE), comprising:
    receiving, from a relay UE on a communication channel, data in a plurality of component carriers in resources corresponding to a multiple component carrier grant, the multiple component carrier grant derived from a different multiple component carrier grant including a different plurality of component carriers; and
    transmitting, to the relay UE on a communication channel, different data on a sidelink communication channel.
12. The method of clause 11, wherein the different multiple component carrier corresponds to a downlink transmission and the multiple component carrier corresponds to a sidelink transmission.
13. The method of any of clause 11 to clause 12, wherein the multiple component carrier grant is based on a mapping of a first multiple component carrier grant to a second multiple component carrier grant.
14. The method of any of clause 11 to clause 13, wherein a size of sidelink control information (SCI) is based on a number of component carriers per multiple component carrier grant, the method further comprising:

receiving at least the multiple component carrier grant includes receiving, via SCI to the remote UE, at least the multiple component carrier grant.
15. The method of any of clause 11 to clause 14, further comprising:
receiving, from the relay UE, a downlink transmission on a first component carrier of the plurality of component carriers using a first sidelink grant associated with one of the plurality of component carriers; and
receiving, from the relay UE, a downlink transmission on a second component carrier of the plurality of component carriers is relayed to the remote UE using a second sidelink grant associated with the one of the plurality of component carriers.
16. An apparatus for wireless communication, comprising a transceiver; a memory configured to store instructions; and at least one processor communicatively coupled with the transceiver and the memory, wherein the at least one processor is configured to perform the operations of the method of any of clause 1 to clause 15.
17. An apparatus for wireless communication, comprising means for performing the operations of the method of any of clause 1 to clause 15.
18. A non-transitory computer-readable medium, comprising code executable by one or more processors to perform the operations of the method of any of clause 1 to clause 15.
19. A method of wireless communication at a network entity, comprising:
determining a first multiple component carrier grant including a first plurality of component carriers associated with a first communication channel, the first multiple component carrier grant used to determine a second multiple component carrier grant associated with the a second communication channel and includes a second plurality of component carriers.
transmitting, to a relay UE on the first communication channel, the first multiple component carrier grant.
20. The method of clause 19, wherein the second multiple component carrier grant is further composed of mapping of the second multiple component carrier grant to the first multiple component carrier grant.
21. The method of any of clause 19 to clause 20, wherein a size of the DCI is based on a number of component carriers per multiple component carrier grant.
22. The method of any of clause 19 to clause 21, wherein the first communication channel corresponds to a PDSCH.
23. The method of any of clause 19 to clause 22, wherein the second communication channel corresponds to a PSSCH.
24. An apparatus for wireless communication, comprising a transceiver; a memory configured to store instructions; and at least one processor communicatively coupled with the transceiver and the memory, wherein the at least one processor is configured to perform the operations of the method of any of clause 19 to clause 23.
25. An apparatus for wireless communication, comprising means for performing the operations of the method of any of clause 19 to clause 23.
26. A non-transitory computer-readable medium, comprising code executable by one or more processors to perform the operations of the method of any of clause 19 to clause 23.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a relay user equipment (UE), comprising:
receiving, from a network entity, a first multiple component carrier grant including a first plurality of component carriers associated with a first communication channel;
identifying a second multiple component carrier grant based on the first multiple component carrier grant, the second multiple component carrier grant is associated with a second communication channel and includes a second plurality of component carriers;
receiving data on the first plurality of component carriers in resources corresponding to the first multiple component carrier grant;
transmitting, to a remote UE, the received data in the second plurality of component carriers in resources corresponding to the second multiple component carrier grant;
identifying a partition of the data received on the first plurality of component carriers; and
relaying a first portion of the partition using one of the plurality of the second component carriers and a second portion of the partition using another one of the plurality of the second component carriers.

2. The method of claim 1, wherein the first multiple component carrier grant corresponds to a downlink transmission and the second multiple component carrier grant corresponds to a sidelink transmission.

3. The method of claim 2, wherein identifying the second multiple component carrier grant is further composed of mapping of the second multiple component carrier grant to the first multiple component carrier grant.

4. The method of claim 3, wherein the first multiple component carrier grant corresponds to a downlink grant defined in a downlink control information (DCI), and wherein a size of the DCI is based on a number of component carriers per multiple component carrier grant.

5. The method of claim 1, further comprising:
identifying a size of sidelink control information (SCI) based on a number of component carriers per the second multiple component carrier grant,
wherein transmitting in the second plurality of component carriers includes transmitting, via SCI to the remote UE, in one or more of the second plurality of component carriers.

6. The method of claim 1, further comprising:
receiving data on a physical downlink shared channel (PDSCH);
transmitting a negative acknowledgment (NACK) in response to receiving data on the PDSCH; and
terminating the second multiple component carrier grant associated with the PDSCH.

7. The method of claim 1, wherein the first multiple component carrier grant is combined with the second multiple component carrier grant as a single grant associated with a respective downlink payload and sidelink grant.

8. The method of claim 1, wherein a downlink transmission on a first component carrier of the first plurality of component carriers is relayed to the remote UE using a first sidelink grant associated with one of the second plurality of component carriers, and a downlink transmission on a second component carrier of the first plurality of component carriers is relayed to the remote UE using a second sidelink grant associated with the one of the second plurality of component carriers.

9. The method of claim 1, wherein the first communication channel corresponds to a physical downlink shared channel (PDSCH), and the second communication channel corresponds to a physical sidelink shared channel (PSSCH).

10. A method of wireless communication at a remote user equipment (UE), comprising:
receiving, from a relay UE on a communication channel, data in a plurality of component carriers in resources corresponding to a multiple component carrier grant, the multiple component carrier grant derived from a different multiple component carrier grant including a different plurality of component carriers, wherein the data includes a first portion of a partition using one of the plurality of the component carriers and a second portion of the partition using another one of the plurality of the component carriers; and
transmitting, to the relay UE on a communication channel, different data on a sidelink communication channel.

11. The method of claim 10, wherein the different multiple component carrier corresponds to a downlink transmission and the multiple component carrier corresponds to a sidelink transmission.

12. The method of claim 11, wherein the multiple component carrier grant is based on a mapping of a first multiple component carrier grant to a second multiple component carrier grant.

13. The method of claim 10, wherein a size of sidelink control information (SCI) is based on a number of component carriers per multiple component carrier grant, the method further comprising:
receiving at least the multiple component carrier grant includes receiving, via SCI to the remote UE, at least the multiple component carrier grant.

14. The method of claim 10, further comprising:
receiving, from the relay UE, a downlink transmission on a first component carrier of the plurality of component carriers using a first sidelink grant associated with one of the plurality of component carriers; and
receiving, from the relay UE, a downlink transmission on a second component carrier of the plurality of component carriers is relayed to the remote UE using a second sidelink grant associated with the one of the plurality of component carriers.

15. An apparatus for wireless communication, comprising:
a transceiver;
a memory configured to store instructions; and
at least one processor communicatively coupled with the transceiver and the memory, wherein the at least one processor is configured to:
receive, from a network entity, a first multiple component carrier grant including a first plurality of component carriers associated with a first communication channel;
identify a second multiple component carrier grant based on the first multiple component carrier grant, the second multiple component carrier grant is associated with a second communication channel and includes a second plurality of component carriers;
receive data on the first plurality of component carriers in resources corresponding to the first multiple component carrier grant;
transmit, to a remote UE, the received data in the second plurality of component carriers in resources corresponding to the second multiple component carrier grant
identify a partition of the data received on the first plurality of component carriers; and
relay a first portion of the partition using one of the plurality of the second component carriers and a second portion of the partition using another one of the plurality of the second component carriers.

16. The apparatus of claim 15, wherein the first multiple component carrier grant corresponds to a downlink transmission and the second multiple component carrier grant corresponds to a sidelink transmission.

17. The apparatus of claim 16, wherein to identifying the second multiple component carrier grant is further composed of mapping of the second multiple component carrier grant to the first multiple component carrier grant.

18. The apparatus of claim 17, wherein the first multiple component carrier grant corresponds to a downlink grant defined in a downlink control information (DCI), and wherein a size of the DCI is based on a number of component carriers per multiple component carrier grant.

19. The apparatus of claim 16, wherein the at least one processor is further configured to:

identify a size of sidelink control information (SCI) based on a number of component carriers per the second multiple component carrier grant,
wherein to transmit in the second plurality of component carriers, the at least one processor is further configured to transmit, via SCI to the remote UE, in one or more of the second plurality of component carriers.

20. The apparatus of claim 15, wherein the at least one processor is further configured to:
receive data on a physical downlink shared channel (PDSCH);
transmit a negative acknowledgment (NACK) in response to receiving data on the PDSCH; and
terminate the second multiple component carrier grant associated with the PDSCH.

21. The apparatus of claim 15, wherein the first multiple component carrier grant is combined with the second multiple component carrier grant as a single grant associated with a respective downlink payload and sidelink grant.

22. The apparatus of claim 15, wherein a downlink transmission on a first component carrier of the first plurality of component carriers is relayed to the remote UE using a first sidelink grant associated with one of the second plurality of component carriers, and a downlink transmission on a second component carrier of the first plurality of component carriers is relayed to the remote UE using a second sidelink grant associated with the one of the second plurality of component carriers.

23. The apparatus of claim 15, wherein the first communication channel corresponds to a physical downlink shared channel (PDSCH), and the second communication channel corresponds to a physical sidelink shared channel (PSSCH).

24. An apparatus for wireless communication, comprising:
a transceiver;
a memory configured to store instructions; and
at least one processor communicatively coupled with the transceiver and the memory, wherein the at least one processor is configured to:
receive, from a relay UE on a communication channel, data in a plurality of component carriers in resources corresponding to a multiple component carrier grant, the multiple component carrier grant derived from a different multiple component carrier grant including a different plurality of component carriers, wherein the data includes a first portion of a partition using one of the plurality of the component carriers and a second portion of the partition using another one of the plurality of the component carriers; and
transmit, to the relay UE on a communication channel, different data on a sidelink communication channel.

25. The apparatus of claim 24, wherein the different multiple component carrier corresponds to a downlink transmission and the multiple component carrier corresponds to a sidelink transmission.

26. The apparatus of claim 25, wherein the multiple component carrier grant is based on a mapping of a first multiple component carrier grant to a second multiple component carrier grant.

27. The apparatus of claim 24, wherein a size of sidelink control information (SCI) is based on a number of component carriers per multiple component carrier grant, and wherein the at least one processor is further configured to:
receive at least the multiple component carrier grant includes receiving, via SCI to the remote UE, at least the multiple component carrier grant.

28. The apparatus of claim 24, wherein the at least one processor is further configured to:
receive, from the relay UE, a downlink transmission on a first component carrier of the plurality of component carriers using a first sidelink grant associated with one of the plurality of component carriers; and
receive, from the relay UE, a downlink transmission on a second component carrier of the plurality of component carriers is relayed to the remote UE using a second sidelink grant associated with the one of the plurality of component carriers.

* * * * *